United States Patent [19]
Bourgeois

[11] Patent Number: 5,360,100
[45] Date of Patent: Nov. 1, 1994

[54] ROLLER CONVEYOR

[76] Inventor: Ronald D. Bourgeois, 80 Front St., Scituate, Mass. 02066

[21] Appl. No.: 184,189

[22] Filed: Jan. 21, 1994

[51] Int. Cl.⁵ .............................................. B65G 13/07
[52] U.S. Cl. ....................................................... 198/790
[58] Field of Search ......................................... 198/790

[56] References Cited

U.S. PATENT DOCUMENTS

| | | |
|---|---|---|
| 843,519 | 2/1907 | Crane . |
| 896,172 | 8/1908 | Thomas . |
| 1,843,440 | 2/1932 | Blythe . |
| 1,923,815 | 8/1933 | Fahrenwald . |
| 2,827,153 | 3/1958 | Olk et al. . |
| 3,040,379 | 6/1962 | Bayer ...................... 198/790 X |
| 3,306,430 | 2/1967 | Fogg . |
| 3,344,903 | 10/1967 | Holm . |
| 3,581,875 | 6/1971 | Guis . |
| 3,643,789 | 2/1972 | Werntz . |
| 4,013,403 | 3/1977 | Petrus . |
| 4,103,769 | 8/1978 | Jorgensen . |
| 4,140,486 | 2/1979 | Nitschke . |
| 4,144,022 | 3/1979 | Fusco . |
| 4,172,519 | 10/1979 | Leach . |
| 4,196,312 | 4/1980 | DeGood et al. ............. 198/790 X |
| 4,252,234 | 2/1981 | Brouwer ...................... 198/790 |
| 4,266,659 | 5/1981 | Meyer et al. . |
| 4,297,121 | 10/1981 | Rhonehouse . |
| 4,332,608 | 6/1982 | Rhonehouse . |
| 4,344,527 | 8/1982 | Vogt et al. . |
| 4,421,482 | 12/1983 | McMaster . |
| 4,815,588 | 3/1989 | Katsuragi et al. . |
| 4,832,184 | 5/1989 | DeGood . |
| 4,887,707 | 12/1989 | Harms . |
| 4,895,247 | 1/1990 | Marchetti . |
| 4,901,845 | 2/1990 | Zorgiebel . |
| 5,038,922 | 8/1991 | Collins et al. . |
| 5,048,168 | 9/1991 | Vanaschen et al. . |
| 5,082,109 | 1/1992 | Blondeau . |
| 5,244,081 | 9/1993 | Kajii et al. . |

Primary Examiner—James R. Bidwell
Attorney, Agent, or Firm—Shlesinger Arkwright & Garvey

[57] ABSTRACT

A roller conveyor comprises a frame having oppositely disposed substantially parallel sides; a plurality of pulleys disposed on each side of the frame, the pulleys on one side being coaxial with the pulleys on the other side of the frame; a line shaft disposed on one side of the frame; a plurality of belts operatively secured to the line shaft and respective pulleys such that rotation of the shaft causes rotation in one direction of the pulleys; and a plurality of rollers resting freely and disposed between adjacent pairs of the pulleys on each side of the frame, whereby rotation of the pulleys causes rotation of the rollers.

29 Claims, 5 Drawing Sheets

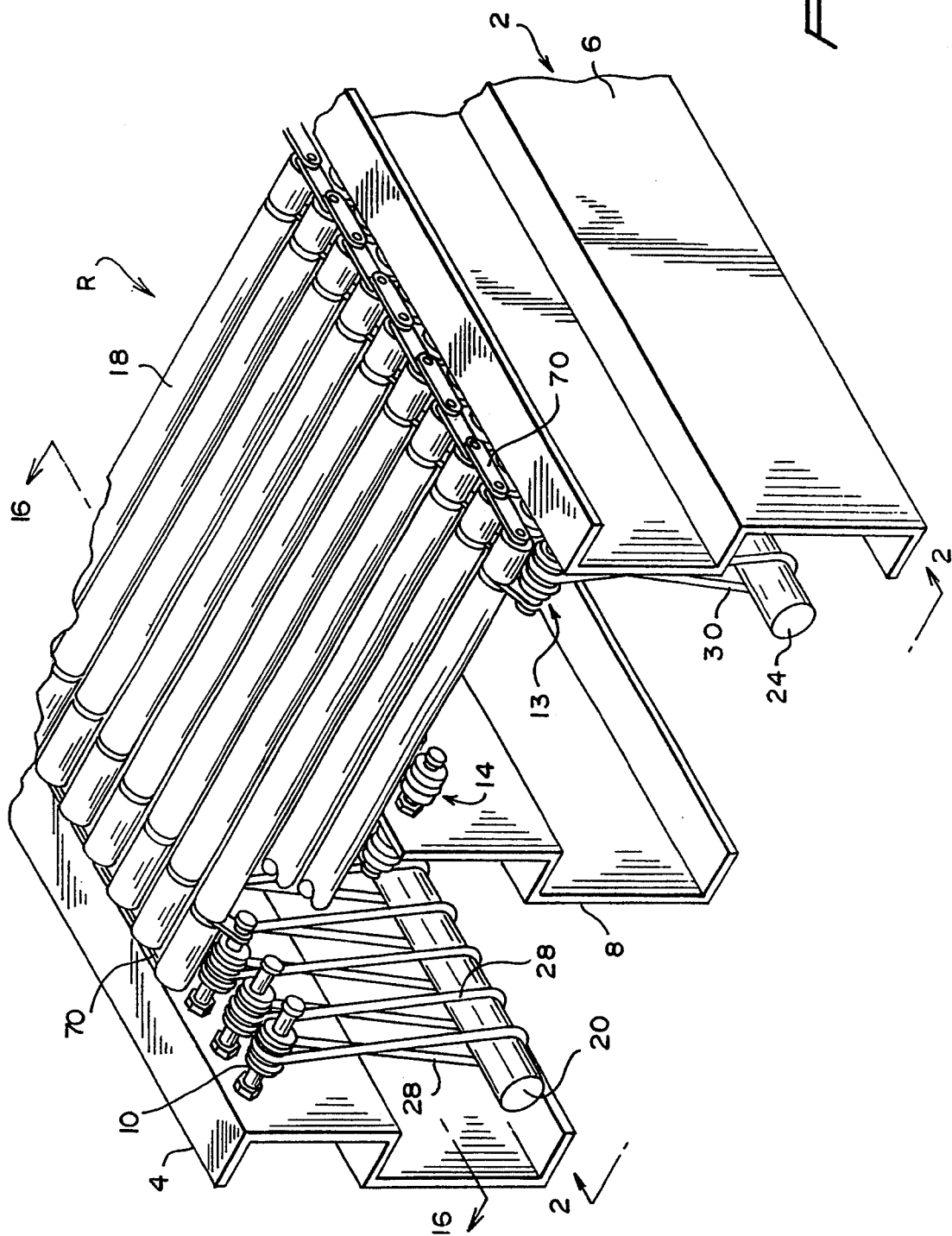

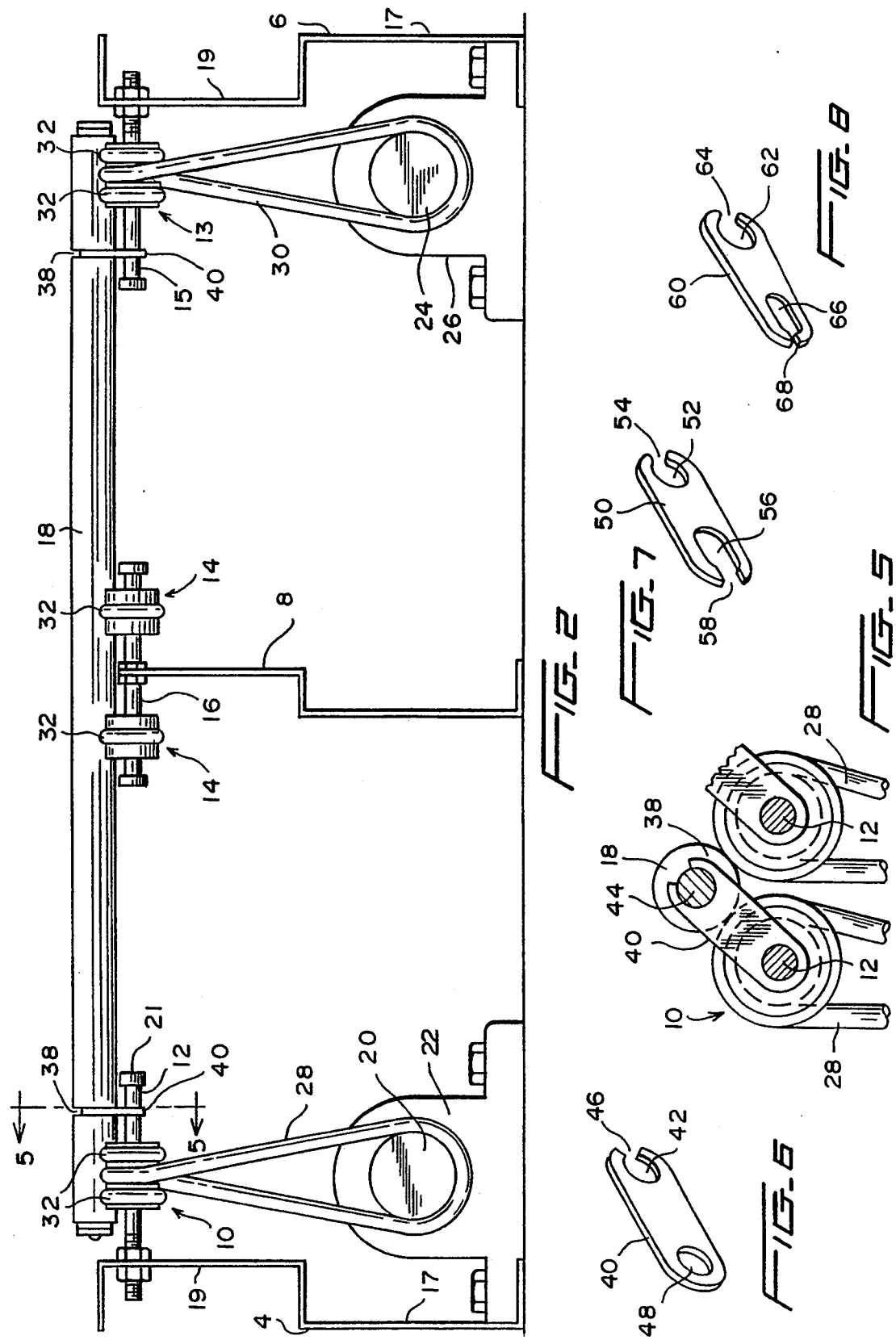

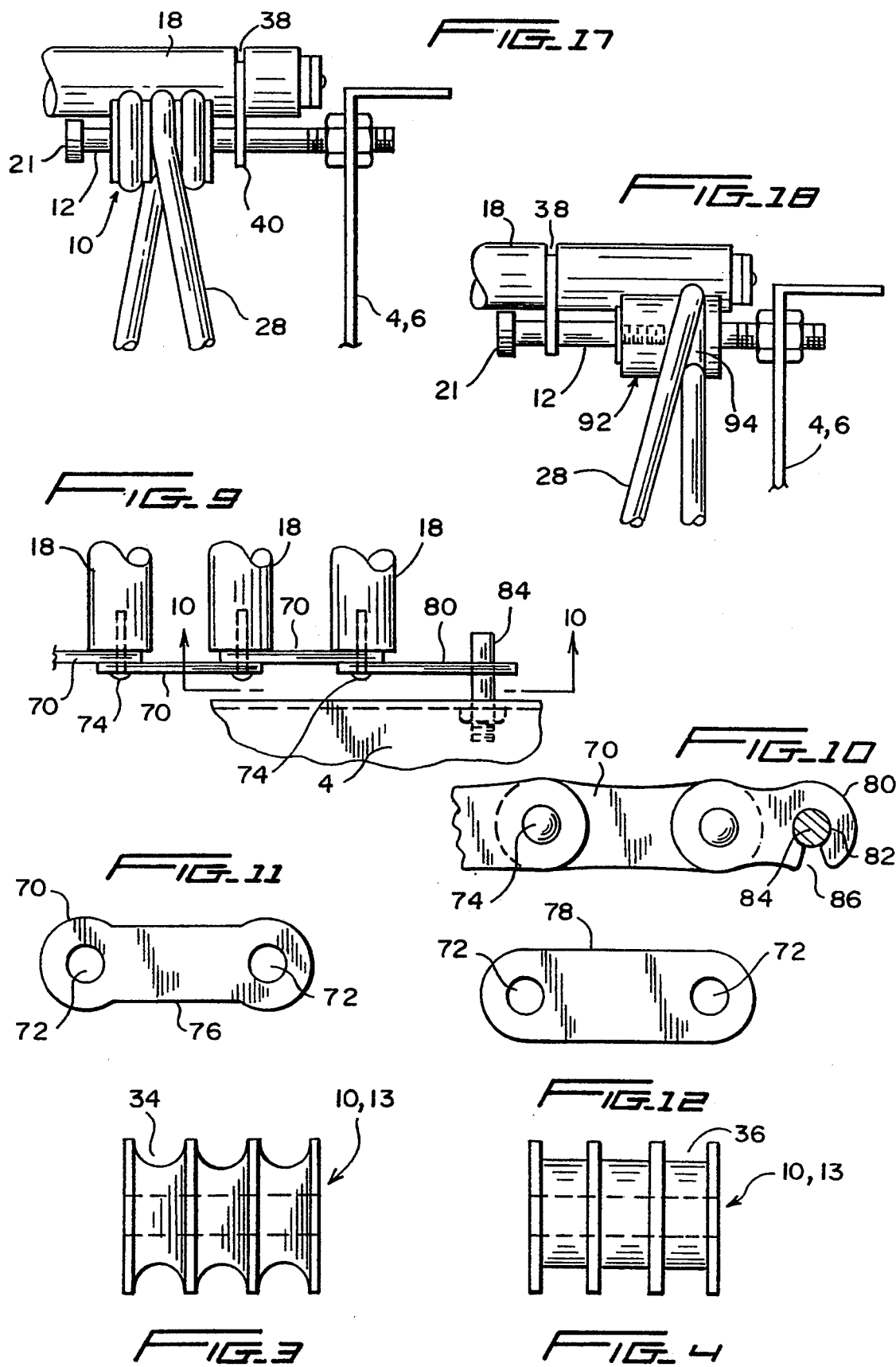

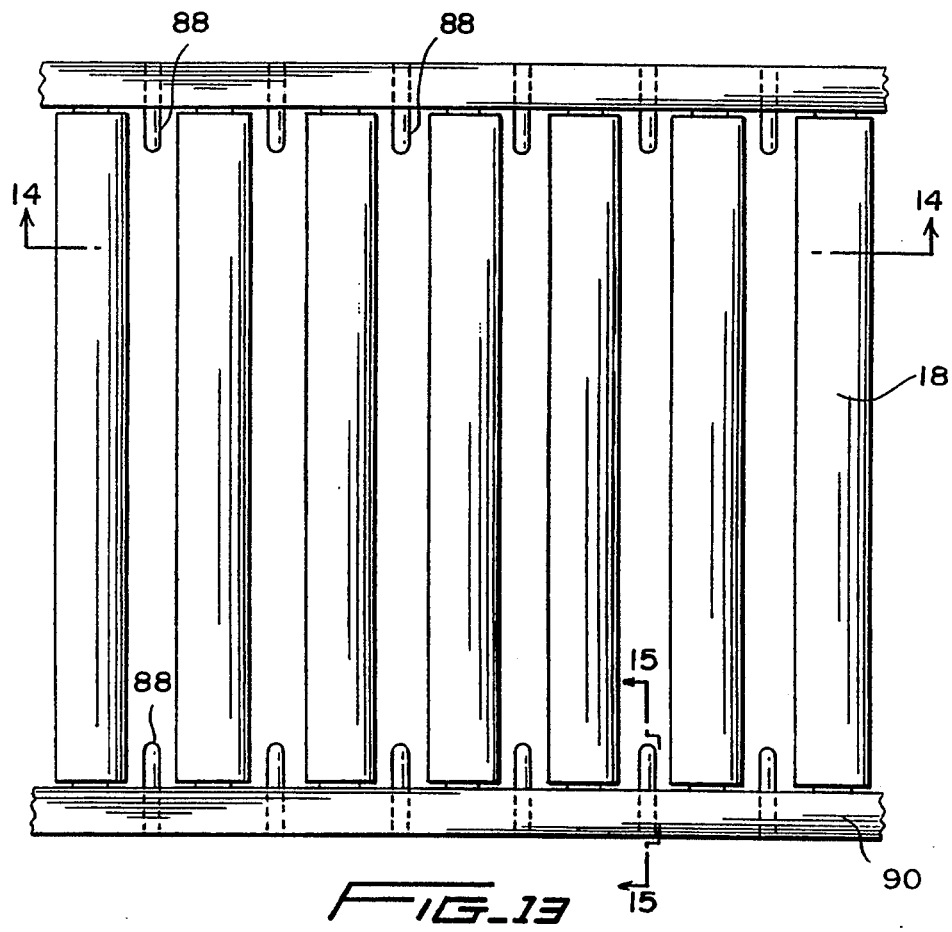
FIG_13
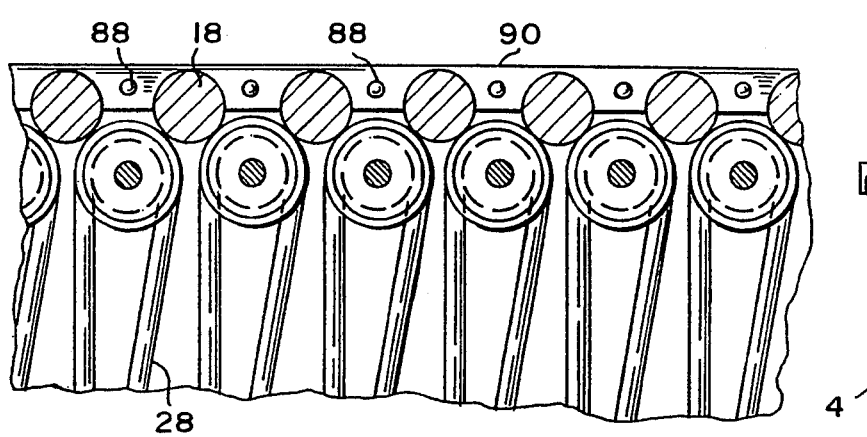
FIG_14
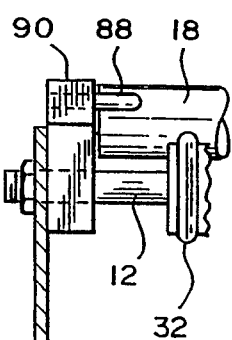
FIG_15

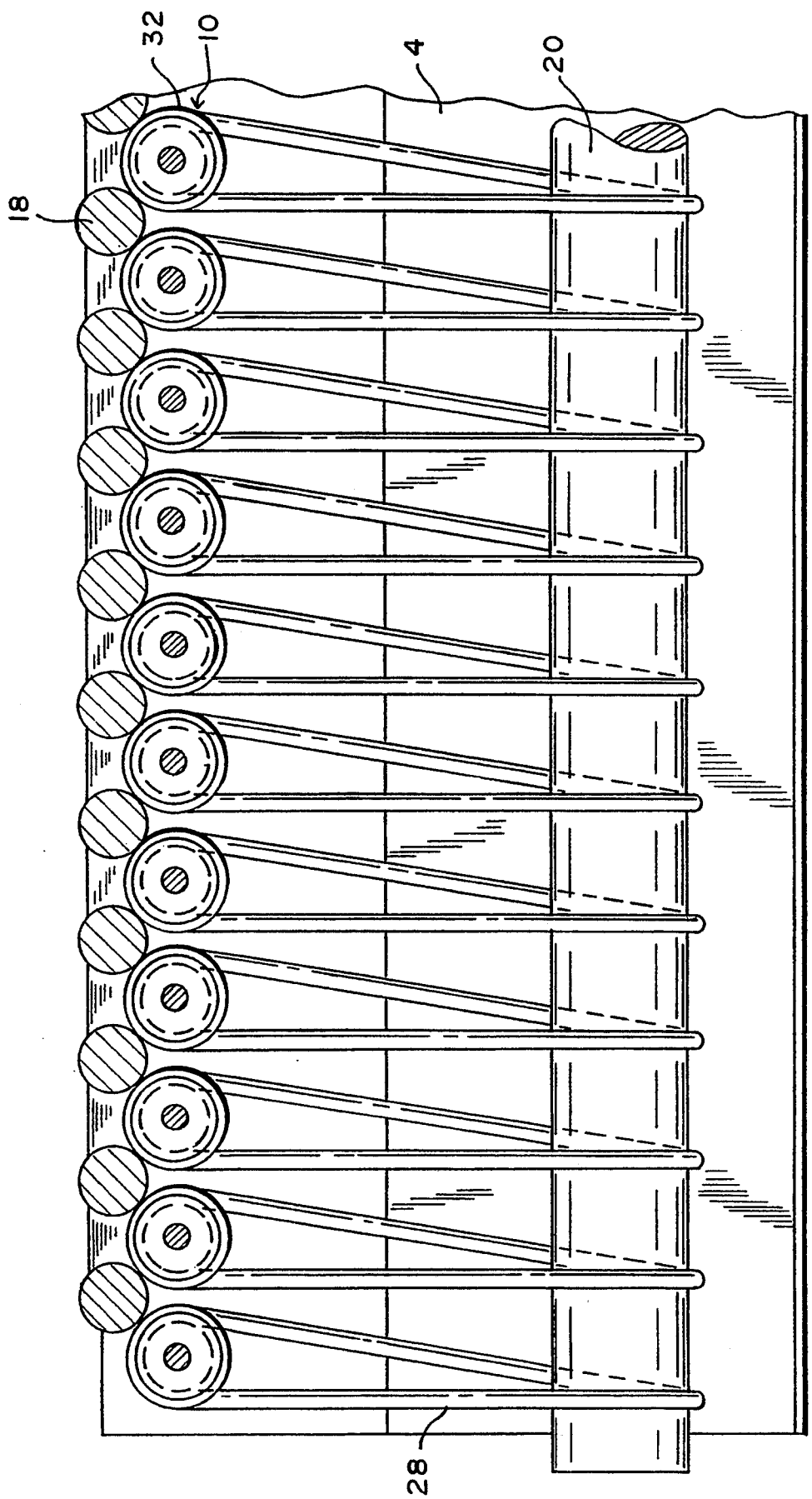

ROLLER CONVEYOR

FIELD OF THE INVENTION

The present invention relates generally to a live roller conveyor and particularly to a roller conveyor wherein the load rollers rest by gravity between adjacent drive pulleys on one side and idler pulleys on another side of the conveyor frame.

BACKGROUND OF THE INVENTION

Prior art line shaft roller conveyors typically have their load rollers secured to the side rails of their frames. Where the line shaft drives the rollers with belts, the belts are typically directly wrapped around the rollers. For maintenance and replacement purposes, removal of the rollers would be relatively time consuming, requiring the conveyor to be shut down for relatively longer period. In the food industry where stringent sanitary requirements are standard, cleaning the rollers would be time consuming where the rollers had to be removed for thorough cleaning.

There is therefore a need for roller conveyors that solve the above problems.

OBJECTS AND SUMMARY OF THE INVENTION

It is therefore an object of the present invention to provide a roller conveyor that is relatively easy to maintain.

It is another object of the present invention to provide a roller conveyor where the drive or load rollers can be relatively easily replaced.

It is still another object of the present invention to provide a roller conveyor where the drive or load rollers are not attached to the conveyor frame and are free floating and held in place by gravity, thereby making the replacement with different style rollers relatively easy.

It is yet another object of the present invention to provide a roller conveyor where the load rollers are not attached to the side structure of the frame.

It is another object of the present invention to provide a roller conveyor that can be driven at relatively greater speeds.

These and other objects of the present invention will become apparent from the following detailed description.

BRIEF DESCRIPTION OF THE DRAWINGS

FIG. 1 is a fragmentary perspective view of a roller conveyor in accordance with the present invention.

FIG. 2 is an enlarged end view of the roller conveyor taken along line 2—2 in FIG. 1.

FIG. 3 is an enlarged lateral view of a pulley used in the present invention.

FIG. 4 is an enlarged view of another embodiment of a pulley used in the present invention.

FIG. 5 is an enlarged fragmentary and cross-sectional view taken along line 5—5 in FIG. 2.

FIGS. 6, 7 and 8 are enlarged perspective views of various embodiments of a retaining clip used in the present invention.

FIG. 9 is an enlarged fragmentary top view showing a detail of the interconnection of adjacent rollers.

FIG. 10 is an enlarged view taken along line 10—10 of FIG. 9.

FIGS. 11 and 12 are enlarged front views of two embodiments of the connecting links used in the present invention.

FIG. 13 is a top view of another embodiment of a roller conveyor made in accordance with the present invention.

FIG. 14 is a cross-sectional view taken along line 14—14 in FIG. 13.

FIG. 15 is a cross-sectional view taken along line 15—15 in FIG. 13.

FIG. 16 is an enlarged cross-sectional view taken along line 16—16 in FIG. 1.

FIG. 17 is a fragmentary enlarged view of an end portion of the roller secured by a clip to the shaft of the pulley.

FIG. 18 is a fragmentary enlarged view of a single groove pulley supporting and driving the roller.

DETAILED DESCRIPTION OF THE INVENTION

A roller conveyor R in accordance with the present invention is disclosed in FIG. 1. The roller conveyor R comprises a frame 2 having oppositely disposed and parallel side rails 4 and 6. A center rail 8 may be used to advantageously provide intermediate support if needed. A plurality of pulleys 10 and 13 rotatably supported on shafts 12 and 15 are disposed along the inner sides of the side rails 4 and 6, respectively. The pulleys 10 on the side rail 4 are coaxial with the pulleys 13 disposed along the side rail 6, as best shown in FIGS. 1 and 2. Where the center rail 8 is used, a plurality of idler pulleys 14 rotatably secured to shafts 16 are disposed along the rail 8 in coaxial alignment with the pulleys 10 and 13.

The side rails 4 and 6 have bottom portions 17 and upper portions 19 that are offset from each other such that the upper portions 19 are cantilevered from the lower portions 17, as best shown in FIG. 2. The shafts 12 and 15 are short and do not span the distance across the side rails 4 and 6. Instead, the shafts 12 and 15 are cantilevered from the upper portions 19 of the side rails 4 and 6.

A plurality of drive or load rollers 18 rest between adjacent pulleys 10 and 13 and idler pulleys 14, as best shown in FIG. 1. The articles (not shown) being conveyed rest on the rollers 18, thereby driving the articles when the rollers rotate. The rollers 18 are disposed in spaced parallel configuration with their end portions being supported by the pulleys 10 and 13 and their intermediate portions by the idler wheels 14.

A line shaft 20 is disposed along the lower end of the side rail 4 and transversely to the rollers 18. The line shaft 20 is supported in bearing housing 22, as best shown in FIG. 2. Another line shaft 24 disposed adjacent the side rail 4 may be used, if required, to provide an additional driving torque to the rollers 18. The line shaft 24 is similarly supported in bearing housing 26 and disposed transversely to the rollers 18. The line shafts 20 and 24 are rotated by a drive motor (not shown). The offset between the upper portions 19 from the lower portions 17 of the side rails 4 and 6 advantageously provide space for the bearing housings 22 and 26 to be positioned close to the side rails so that the pulleys 10 and 13 are thereby positioned closely to the side rails, minimizing the amount of cantilever.

A plurality of belts 28 are operably secured to the line shaft 20 and the respective pulleys 10 such that rotation of the line shaft 20 causes rotation of the pulleys 10 about their shafts 12. Where the line shaft 24 is also used, a plurality of belts 30 are similarly secured to the line shaft 24 and the respective pulleys 13 to transmit the torque of the line shaft 24 to the pulleys 13.

Resilient rings or tires 32 are secured around each of the pulleys 10 and 13 and idler pulleys 14, as best shown in FIG. 2. Each resilient ring 32 is adapted to fictionally engage the rollers 18 that are disposed on respective pairs of pulleys 10 and 13 and the idler wheels 14 such that rotation of the pulleys 10 causes corresponding rotation of the rollers 18.

Each of the pulleys 10 and 13 has a plurality of arcuate circumferential grooves 34, as best shown in FIG. 3, that are adapted to receive correspondingly shaped rings 32 and the belts 28 and 30, such as "O"-shaped rings and belts. Each of the pulleys 10 and 13 can also have different shaped annular grooves, such as rectangular annular grooves 36, as best shown in FIG. 4. The grooves 36 are adapted to receive a flat belt 28 or 30 and ring 32. The rings 32 have advantageously larger cross-sectional area than those of the belts 28 and 30 such that the rings and not the belts engage the rollers 18. The rings 32 are advantageously disposed on each side of the belts 28 and 30 to balance the forces transferred by the belts to the rollers 18. The drive belts 28 and the rings 32 are preferably made of urethane or other suitable materials.

Each of the rollers 18 has an annular groove 38 disposed at its end portion, as best shown in FIG. 2. A plurality of retaining clips 40 are disposed in respective grooves 38 and secured to the respective shafts 12 and 15 to hold the rollers 18 in place and prevent the rollers from jumping out of place, as best shown in FIG. 5. Each of the retaining clips 40 has an opening 42 at one end adapted to secure around a reduced diameter 44 of each roller 18. A slot 46 communicating with the opening 42 permits the clip 40 to be snapped in around the reduced diameter 44. The other end of the clip 40 has an opening 48 adapted to be rotatably secured to the respective shafts 12 and 15, as best shown in FIG. 5. Each of the shafts 12, 13 and 16 has an enlarged end portion 21 to advantageously prevent the pulleys 10 from coming off the shafts.

Another embodiment of the retainer clip 40 is disclosed as clip 50 in FIG. 7. The clip 50 has an opening 52 with a connected slot 54 at one end and an elongated opening 56 and a communicating slot 58 at the other end, as best shown in FIG. 7. The slot 54 is adapted to slip through the reduced diameter 44 to secure the clip 7 to the roller 18. Similarly, the slot 58 is adapted to deformably slip through the shaft 12 and permit the clip 50 to be secured to the shaft 12. The elongated opening 56 allows for some lateral movement of the roller 18 to advantageously prevent binding between the pulleys 10 and 13 and the rollers 18.

Still another embodiment of the retainer clip 40 is disclosed as clip 60 in FIG. 8. The clip 60 has an opening 62 with a communicating slot 64 at one of its ends and an elongated opening 66 with a communicating slot 68 at its other end. The clip 60 has a tapered body where the opening 66 is narrower than the diameter of the opening 62. The clips 40, 50 and 60 are advantageously made from a plastic material, such as DELDRIN, which is relatively slippery and lightweight. The clips 40, 50 and 60 advantageously hold the rollers 18 in place during operation and prevent them from jumping out of place.

Alternatively, in lieu of the clips 40, the rollers 18 may be secured to each other by means of a plurality of links 70, as best shown in FIGS. 1, 9 and 10. The rollers 18 may be linked together in any convenient number that would be relatively easy to handle. Each of the links 70 has openings 72 at each end portion thereof adapted to receive a retaining screw 74 for securing to the rollers 18. Each of the screws 74 is threadedly secured into the center of each roller 18, as best shown in FIG. 9. The links 70 may have a reduced intermediate portion 76 to advantageously provide clearance between adjacent rollers 18 and minimize interference with the articles being conveyed, as best shown in FIG. 11.

Another embodiment of the link 70 is disclosed as link 78 in FIG. 12. The link 78 has similar openings 72 adapted to receive the retaining screws 74 to secure the link 78 to the rollers 18.

An anchor link 80 may be used to secure each group of rollers to the respective side rails 4 and 6, as best shown in FIG. 10. The anchor link 80 includes an opening 82 adapted to receive an anchor bolt 84 and a communicating slot 86 adapted to deformably snap through the diameter of the anchor bolt 84, as best shown in FIGS. 9 and 12. The other end of the anchor link 80 is secured to the roller 18 with the screw 74.

The rollers 18 may also be secured in place during operation by a plurality of pins or projections 88 that are disposed inwardly between adjacent rollers 18, as best shown in FIG. 13. The pins 88 are secured to a frame 90 that is secured to the respective side rails 4 and 6, as best shown in FIG. 15. The pins 88 advantageously prevent the rollers 18 from moving out of their places during operation.

In operation, the line shafts 20 and 24 are rotated in the same direction. The rotation is transmitted to the pulleys 10 and 13 by the belts 28 and 30. Assuming the shafts 20 are rotating counterclockwise, as viewed in FIG. 2, then the pulleys will be rotating clockwise as viewed in FIG. 16. The resulting clockwise rotations of the pulleys 10 will then impart counterclockwise rotation to the rollers 18. An article resting on the rollers 18 will then move towards the left, with reference to FIG. 16. A clockwise rotation of the line shafts 20 and 24 will cause the article being conveyed to move towards the right of FIG. 16.

The roller conveyor R is typically operated such that an article being conveyed would travel in a range of 60 to 100 feet per minute. Normally, only a single line shaft, such as line shaft 20 is used. For heavier loads, the second line shaft 24 may be provided for additional power and thereby prevent stalling. The line shafts 20 and 24 may be operated from the same motor utilizing conventional transmission means.

The rollers 18 operate by means of frictional contact with the pulleys 10 and 13, using the weight of the rollers 18 and the articles being conveyed to effectively engage the pulleys. The heavier the load exerted on top of the rollers 18, the more friction will be generated between the rollers and the pulleys.

The clip 40 may be secured to the shaft 12 adjacent the side rail 4 or 6, as best shown in FIG. 17.

Another embodiment of the pulley is disclosed in FIG. 18 as pulley 92 which has a single groove 94 for receiving the belt 28. The belts 28 are therefore in direct driving contact with the rollers 18.

The clips 40 are advantageously removable from the rollers 18 by simply forcing the reduced diameters 44 through the slots 45. Similarly, the clips 50 are adapted to be easily removed from the shafts 12 and 15, by deformably forcing the shafts through the slots 58. For replacements or repair, removal and installation of the rollers 18 are thus facilitated.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A roller conveyor, comprising:
   a) a frame having oppositely disposed substantially parallel sides;
   b) a plurality of pulleys disposed on each side of said frame, said pulleys on one side being coaxial with said pulleys on the other side of said frame;
   c) a line shaft disposed on one side of said frame;
   d) a plurality of belts operatively secured to said line shaft and respective pulleys such that rotation of said shaft causes rotation in one direction of said pulleys;
   e) a plurality of rollers resting freely and disposed between adjacent pairs of said pulleys, whereby rotation of said pulleys causes rotation of said rollers; and
   f) each of said pulleys including a resilient ring in frictional engagement with said rollers.

2. A roller conveyor as in claim 1, wherein:
   a) said pulleys include annular grooves; and
   b) said rings are disposed within said grooves.

3. A roller conveyor as in claim 1, wherein:
   a) said rings have circular cross-section.

4. A roller conveyor as in claim 1, wherein:
   a) each of said pulleys include a plurality of grooves;
   b) said belts are associated with one of said grooves; and
   c) first and second rings disposed respectively on each side of said belt and disposed in the other of said grooves.

5. A roller conveyor as in claim 1, wherein:
   a) at least every pair of said rollers are secured to each other.

6. A roller conveyor as in claim 1, and further comprising:
   a) a plurality of links rotatably securing at least every pair of said rollers.

7. A roller conveyor as in claim 6, and further comprising:
   a) an anchor link secured to said at least every pair of rollers and said frame.

8. A roller conveyor as in claim 7, wherein:
   a) said anchor link includes an opening and a slot communicating therewith; and
   b) said slot is adapted to removably snap into an anchor rod secured to said frame.

9. A roller conveyor as in claim 6, wherein:
   a) said links are made of plastic.

10. A roller conveyor as in claim 1, wherein:
    a) said rollers include annular grooves disposed at their end portions;
    b) said pulleys include respective shafts secured to said frame; and
    c) a plurality of clips secured respectively to said shafts and said annular grooves of said rollers.

11. A roller conveyor as in claim 10, wherein:
    a) said clips include slots at each end portions thereof; and
    b) said slots are adapted to snap into said annular grooves of said rollers and said shafts.

12. A roller conveyor as in claim 10, wherein:
    a) said clips are made of plastic.

13. A roller conveyor as in claim 1, wherein:
    a) said sides of said frame include pins disposed toward each other and between said rollers.

14. A roller conveyor as in claim 1, wherein:
    a) said sides of said frame includes first and second side walls;
    b) said first wall is offset inwardly of said second wall; and
    c) said pulleys are secured to said first wall.

15. A roller conveyor, comprising:
    a) a frame having oppositely disposed substantially parallel sides;
    b) a plurality of pulleys disposed on each side of said frame, said pulleys on one side being coaxial with said pulleys on the other side of said frame;
    c) said pulleys including resilient rings;
    d) a line shaft disposed on one side of said frame;
    e) a plurality of belts operatively secured to said line shaft and respective pulleys such that rotation of said shaft causes rotation in one direction of said pulleys;
    f) a plurality of rollers resting freely and disposed between adjacent pairs of said pulleys and frictionally engaging said rings, whereby rotation of said pulleys causes rotation of said rollers;
    g) said pulleys including a plurality of annular grooves; and
    h) said belts and said rings are disposed in said grooves.

16. A roller conveyor as in claim 15, wherein:
    a) said pulleys include shafts secured to said frame; and
    b) said shafts are cantilevered from said sides of said frame.

17. A roller conveyor as in claim 16, wherein:
    a) said shafts include flanged end portions.

18. A roller conveyor as in claim 15, wherein:
    a) said rollers are disposed between every pair of said pulleys on each side of said frame.

19. A roller conveyor, comprising:
    a) a frame having oppositely disposed substantially parallel sides;
    b) a plurality of pulleys disposed on each side of said frame, said pulleys on one side being coaxial with said pulleys on the other side of said frame;
    c) a drive operably associated with said pulleys for rotating said pulleys;
    d) a plurality of rollers resting freely and disposed between adjacent pairs of said pulleys, whereby rotation of said pulleys causes rotation of said rollers; and
    e) a plurality of pins secured to said sides of said frame, said pins being disposed toward each other and between and outside the periphery of said rollers such that rollers that are thrown up strike said pins and cause the rollers to fall back in place.

20. A roller conveyor as in claim 19, wherein:
    a) said drive includes a line shaft disposed on one side of said frame; and
    b) a plurality of belts operatively secured to said line shaft and respective pulleys such that rotation of said shaft causes rotation in one direction of said pulleys.

21. A roller conveyor as in claim 19, wherein:
a) each of said pulleys includes a resilient ring in frictional engagement with said rollers.

22. A roller conveyor as in claim 21, wherein:
a) said pulleys include annular grooves; and
b) said rings are disposed within said grooves.

23. A roller conveyor, comprising:
a) a frame having oppositely disposed substantially parallel sides;
b) a plurality of pulleys disposed on each side of said frame, said pulleys on one side being coaxial with said pulleys on the other side of said frame;
c) a drive operably associated with said pulleys for rotating said pulleys;
d) a plurality of rollers resting freely and disposed between adjacent pairs of said pulleys, whereby rotation of said pulleys causes rotation of said rollers; and
e) a plurality of links rotatably securing at least every pair of said rollers.

24. A roller conveyor as in claim 23, and further comprising:
a) an anchor link secured to said at least every pair of rollers and said frame.

25. A roller conveyor as in claim 24, wherein:
a) said anchor link includes an opening and a slot communicating therewith; and
b) said slot is adapted to removably snap into an anchor rod secured to said frame.

26. A roller conveyor as in claim 23, wherein:
a) said links are made of plastic.

27. A roller conveyor, comprising:
a) a frame having oppositely disposed substantially parallel sides;
b) a plurality of pulleys disposed on each side of said frame, said pulleys on one side being coaxial with said pulleys on the other side of said frame;
c) a drive operably associated with said pulleys for rotating said pulleys;
d) a plurality of rollers resting freely and disposed between adjacent pairs of said pulleys, whereby rotation of said pulleys causes rotation of said rollers;
e) said rollers including annular grooves disposed at their end portions;
f) said pulleys including respective shafts secured to said frame; and
g) a plurality of clips secured respectively to said shafts and said annular grooves of said rollers.

28. A roller conveyor as in claim 27, wherein:
a) said clips include slots at each end portions thereof; and
b) said slots are adapted to snap into said annular grooves of said rollers and said shafts.

29. A roller conveyor as in claim 27, wherein:
a) said clips are made of plastic.

* * * * *